United States Patent

Lafleur

Patent Number: 5,087,235
Date of Patent: Feb. 11, 1992

[54] METHOD FOR MAKING A COLLAPSIBLE BAG WITH SPOUT

[75] Inventor: Lee Lafleur, Manistee, Mich.

[73] Assignee: Custom Packaging Systems, Inc., Manistee, Mich.

[21] Appl. No.: 580,486

[22] Filed: Sep. 11, 1990

[51] Int. Cl.⁵ .............................. B31B 1/84
[52] U.S. Cl. .................. 493/212; 413/210; 413/213; 413/929; 383/94; 383/66
[58] Field of Search ........... 493/189, 206, 207, 209, 493/210, 211, 212, 213, 214, 215, 929; 156/69, 514; 383/41, 44, 47, 48, 66, 94, 906

[56] References Cited

U.S. PATENT DOCUMENTS

| | | | |
|---|---|---|---|
| 3,011,293 | 12/1961 | Rado | 493/213 X |
| 3,069,303 | 12/1962 | Scholle | 493/213 X |
| 3,244,576 | 4/1966 | Swartz | 493/213 X |
| 3,355,340 | 11/1967 | Calvert et al. | 156/514 X |
| 3,389,643 | 6/1968 | Lemcke et al. | 493/210 X |
| 4,542,530 | 9/1985 | Thomas et al. | 383/66 |
| 4,601,410 | 7/1986 | Bond | 493/213 X |
| 4,695,337 | 9/1987 | Christine | 493/213 X |
| 4,731,978 | 3/1988 | Martensson | 383/66 X |
| 4,872,935 | 10/1989 | Newkirk et al. | 493/213 X |
| 4,924,655 | 5/1990 | Posey | 493/929 X |

Primary Examiner—Bruce M. Kisliuk
Assistant Examiner—John A. Marlott
Attorney, Agent, or Firm—Barnes, Kisselle, Raisch, Choate, Whittemore & Hulbert

[57] ABSTRACT

A generally cubical collapsible bag with six generally rectangular walls of a flexible plastic material. A spout with an enclosed end is attached to the bag by a continuous heat seal. The spout communicates with the interior of the bag through an opening encircled by the heat seal. Preferably the spout is attached to the inside of the bag and passes through the opening and extends exteriorly of the bag.

12 Claims, 2 Drawing Sheets

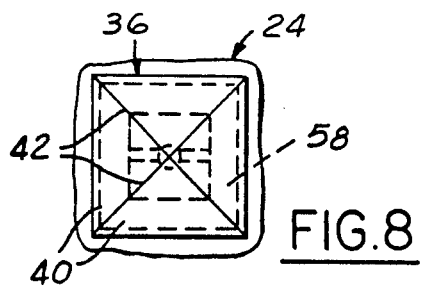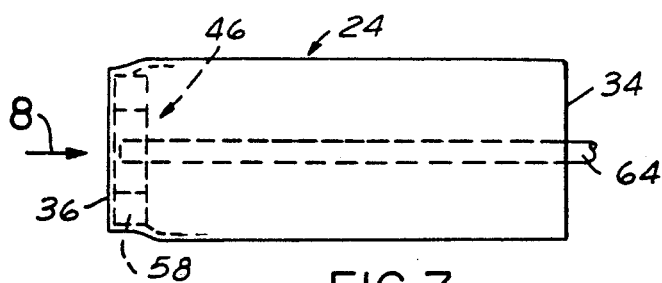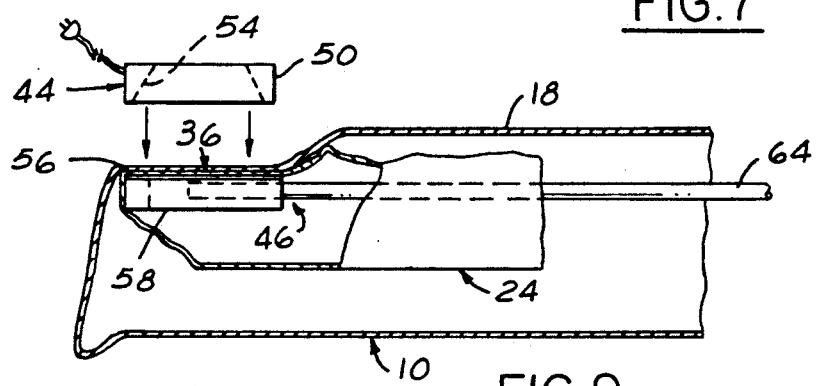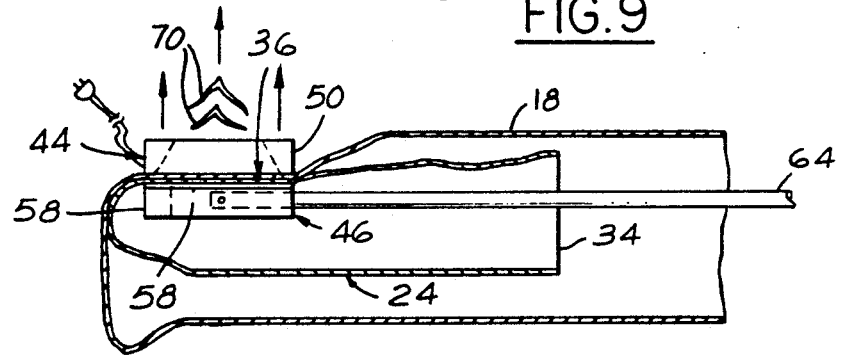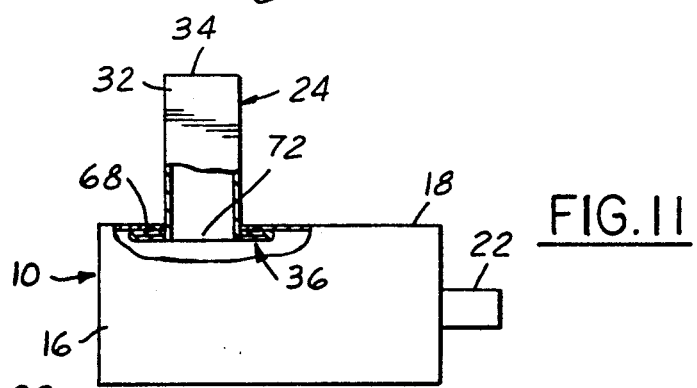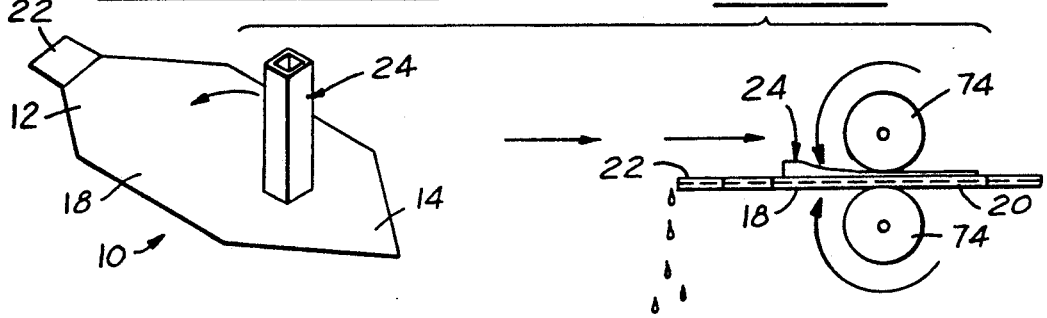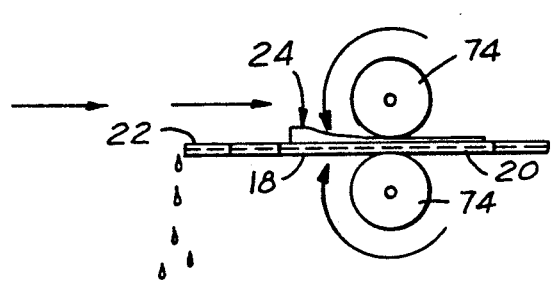

5,087,235

METHOD FOR MAKING A COLLAPSIBLE BAG WITH SPOUT

FIELD OF THE INVENTION

This invention relates to a collapsible shipping and storage container in the form of a bag of a flexible material, and more particularly to a collapsible bag with a spout and a method of making it.

BACKGROUND OF THE INVENTION

Previously, many granular products and some liquids have been shipped and stored in large bulk bags, which may contain as much as a ton or more of material. Some of these bulk bags are flexible and when empty can be folded to a generally flat condition. Such flexible bags are disclosed and claimed in U.S. Pat. Nos. 4,596,040, 4,798,572 and 4,817,824.

These flexible bags are generally cubical and have generally rectangular end walls interconnected by generally rectangular side walls and when filled can be stacked one on top of another. For some applications, preferably the bags are made of a woven fabric and for other applications, a film of plastic material. For some applications, and particularly for storing liquids, a bag of a liquid impervious film of plastic material is received in and reinforced and protected by a bag of a woven fabric. Usually, these bags have an access opening in one or both end walls for filling and emptying the bags. The access opening can be formed in an end wall by joining adjacent sides of adjacent triangular portions together short of the apexes of the triangular portions to thereby provide the access opening. To facilitate emptying the bag, a conduit or spout is disposed in the access opening and connected to the triangular portions. Often the bags have two access openings, an inlet and an outlet. These openings may be sealed, tied or closed by a number of means.

In addition, a bag may have a configuration similar to a pouch or pillow, without rectangular ends formed by triangular portions. Therefore, it is desirable to form a spout separate from the bag and then apply the spout to the bag.

SUMMARY OF THE INVENTION

Containers or bags made by this invention can have various configurations, such as, generally cubical or rectangular or pillow shaped. A pillow shaped bag basically comprises a tubular blank which is completely sealed after the contents have been added. Cubical or rectangular collapsible bags of a flexible material which may be received in an outer carrier are most commonly used for bulk containers.

A cubical or rectangular bag basically comprises a tubular blank, of a flexible plastic material, having, when expanded, a pair of generally opposite square or rectangular ends interconnected by two pairs of generally opposed and rectangular side walls.

The spout basically comprises a tube of a flexible plastic material with an open end, and a closed end. Preferably, the tube has four side walls and a square or rectangular closed end with four generally triangular portions joined each to one of the side walls and sealed together along sealing lines extending generally diagonally from the corners of the end to the center and through each respective apex of each respective triangular portion with the apexes sealed together.

The spout is attached to the bag by applying the closed end of the spout to the bag, sealingly engaging it to the bag by forming a continuous heat sealed joint and removing a portion of both the bag and the closed end of the spout encompassed by the heat sealed joint to provide a through opening.

The spout may be applied to a blank sheet of material before the bag is formed. The spout may also be applied to the blank after forming a continuous peripheral wall of the bag or both the peripheral wall and at least one end wall.

Objects, features and advantages of this invention are to provide a collapsible bag with a collapsible and flexible spout, to form a spout separate from the bag and apply it to the bag at a desired location when making the bag, attachment of one or more spouts at any desired location on the bag, and of economical manufacture and assembly.

BRIEF DESCRIPTION OF THE DRAWINGS

FIG. 7 is a side view of the carrier of the apparatus of FIG. 5 disposed in the spout of FIG. 4.

FIG. 8 is an end view in the direction of arrow 8 of FIG. 7.

FIG. 9 is a side view, with portions broken away, of the apparatus of FIG. 5 being used to heat seal the spout to the bag.

FIG. 10 is a side view of the step of removing scrap pieces from the portion of the bag and spout encompassed by the heat seal to form an opening.

FIG. 11 is a side view, with portions broken away, of the finished flexible bag with the flexible spout attached to the side wall thereof.

FIG. 12 is a diagrammatic view showing the flexible bag and spout of the invention being compressed by wringer rollers to remove all of its contents.

DETAILED DESCRIPTION

Figure 1:
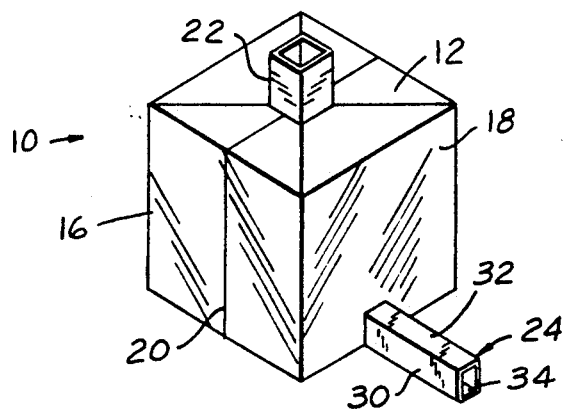
FIG. 1 is a perspective view of a bag with a spout made by the method of this invention.

As shown in FIG. 1 a generally cubical bag 10 is made from a sheet or film of flexible plastic material such as polypropylene or polyethylene. Preferably the bag is formed from a tubular blank which may be made by heat sealing the opposite side edges of a sheet of plastic together. The bag 10 may be generally cubical, pillow shaped or any other suitable shape. However, for most bulk bag applications, preferably the bag is generally cubical with six rectangular wall portions.

Preferably, the bag 10, when expanded, has a pair of generally opposite ends 12,14 interconnected by two pairs of generally opposed and rectangular side walls 16, 18. In order to fold and collapse the bag 10 into a generally flat configuration, the side walls 16 have a pair of gussets 20 each of which forms a pair of interconnected panels which when the bag 10 is collapsed are folded generally flat and overlie one another. The bag 10 may be generally square in cross section or rectangular, depending on the relative width of the two pairs of side walls 16 & 18. The bag has an access opening preferably with a spout 22 in one end. Suitable bags as thus far described are disclosed and claimed in U.S. Pat. Nos. 4,596,040 and 4,790,029 the disclosures of which are incorporated herein by reference.

Figure 2:
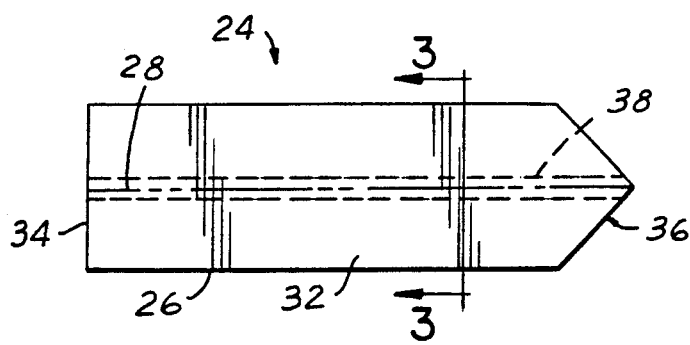
FIG. 2 is a plan view of a folded spout with a continuous peripheral wall.
Figure 3:
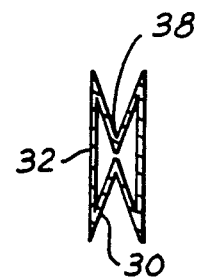
FIG. 3 is a cross section of the folded spout taken along 3—3 of FIG. 2.
Figure 4:
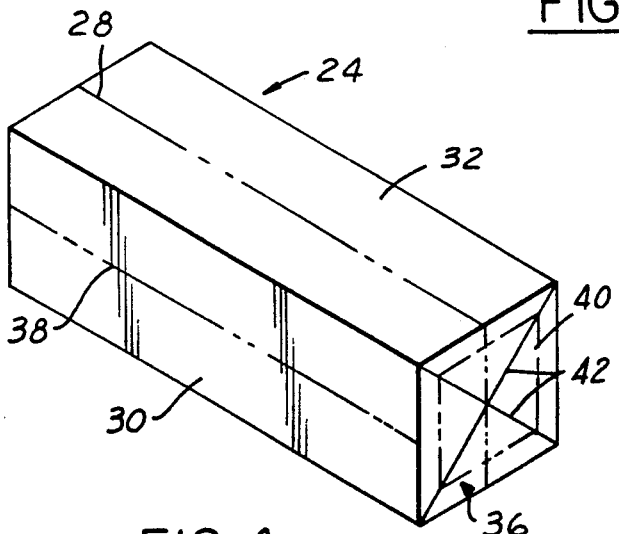
FIG. 4 is a perspective view of the spout of FIG. 2 formed with an enclosed end.

In accordance with this invention, a spout 24 is formed separately and attached to the bag 10. As shown in FIGS. 2-4, the spout is formed from a tubular blank 10 of a sheet of flexible plastic material such as polypropylene or polyethylene. The sheet is formed into a tubular blank 26 by a heat seal 28 connecting the opposite side edges of the sheet together. When expanded, the spout has two pairs of generally opposed and rectangular side walls 30 & 32, an open end 34 and a closed end 36. To facilitate collapsing the spout each of the side walls 30 has a gusset 38 which forms a pair of interconnected panels which when the spout is collapsed are folded generally flat and overlie one another. The spout may be generally square or rectangular in cross section depending on the relative width of the two pairs of side walls 30 & 32. If desired, a spout with a circular or other cross section can be used.

The end 36 of the spout is enclosed by joining the adjacent side edges of adjacent triangular portions 40 along sealing lines of connection 42 which extend generally diagonally from the corners of the end through the apexes of the associated triangular portions. Preferably, for a square end, the triangular portions 40 are substantially identical isosceles triangles, each with a substantially 90° angle at its apex and a pair of substantially 45° acute angles.

The closed end 36 of the spout 24 is attached and sealed to a wall of the bag 10 by a circumferentially continuous heat seal. To provide a through opening into the bag a portion of both the end of the spout encircled by the heat seal and an underlying portion of the bag are removed preferably by pulling away these portions immediately after the heat seal is formed while the adjacent plastic film is still softened by heating to produce the seal. The spout can be applied to any wall portion of the bag and is preferably applied from within the bag and then pulled through the opening encircled by the heat seal to provide a finished appearance when viewed from the exterior of the bag.

Figure 5:
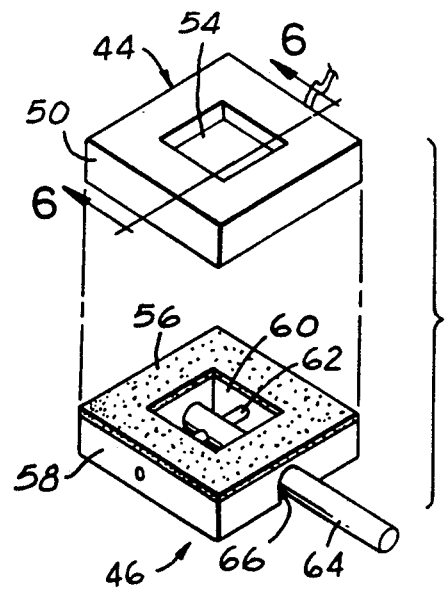
FIG. 5 is a perspective view of a heat sealer and carrier apparatus used to seal the spout to the bag.
Figure 6:
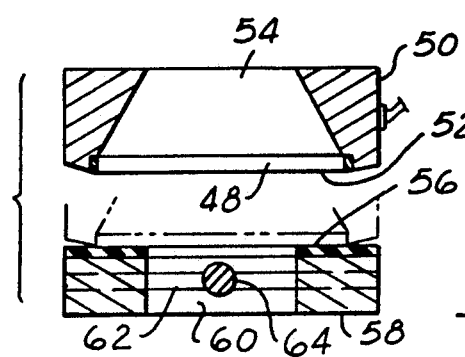
FIG. 6 is a sectional view taken along 6—6 of FIG. 5 which shows the knife edge and support pad of the apparatus.

A suitable heat sealer 44 and supporting carrier and pad assembly 46 for making the heat seal attaching the spout to the bag are shown in FIGS. 5 and 6. For producing a seal, the heat sealer has a continuous heater blade 48 arranged in a rectangular configuration and received in a body 50. If desired, the heater blade 48 could be arranged in a round configuration. To facilitate removal of the portions of plastic film within the heat seal, the blade preferably has a knife edge 52. Preferably, the blade has an electrical resistance heater element and is generally of the type disclosed in U.S. Pat. No. 3,916,148, the disclosure of which is incorporated herein by reference and hence will not be described in further detail. The sealer has a central opening 54 encompassed by the heating element through which the portions of the end of the spout and the bag can be removed.

To facilitate forming a heat seal, overlying portions of the end of the spout and of the bag are urged into firm engagement with the heater element by an underlying resilient support pad 56 of an elastomeric material, such as rubber, received on a carrier plate 58 with a central through hole 60. To facilitate inserting the carrier plate with a spout thereon into the bag, the plate is pivotally connected by a pin 62 to a handle 64. When the carrier plate is pivoted into alignment with the handle, as shown in FIG. 5, it bears on the bottom of a clearance groove 66.

Preferably, the formed spout is turned, inside out or reversed so that after being it is attached to the bag and pulled through its opening it will be right side out and thus its gussets or pleats and associated panels will be in the same orientation as when initially formed.

As shown in FIGS. 7 and 8, to attach the spout to the inside of a bag, it is received over the carrier 46 and the carrier plate 58 is pivoted so that it bears on the closed end of the spout to accurately locate it on the pad 56. To facilitate locating the end 36 of the spout on the pad 56, preferably (as shown in FIG. 8), the carrier plate 58 has the same configuration as the spout end 36 and is only slightly smaller than this end.

As shown in FIG. 9, the carrier 46 and spout are inserted into the bag, such as through the open spout 22 in the top, and the carrier plate 56 is pivoted to a generally horizontal position. The carrier 46 is manipulated to locate the end of the spout in the bag so that the spout will be attached in a desired position, such as at the bottom of a side wall of the bag. Location of the spout at its desired position is facilitated by the "X" or cross pattern of the diagonal heat seals 42 in the end 36 of the spout, particularly if the bag is made of a transparent or translucent plastic film so the "X" or cross pattern can be visually observed from outside the bag.

As shown in FIG. 10, when the spout is in the desired position, the heat sealer 44 is aligned with the carrier 46 and they are pressed together to force the portions of the bag and end of the spout disposed between them into firm engagement with each other and heat transfer relationship with the heater blade 48. The blade is heated to an elevated temperature so that adjacent portions of the plastic film of the bag and spout end are heated and congeal to form a circumferentially continuous heat seal 68 (shown in FIG. 11 and in phantom in FIG. 4). This heat seal both attaches and seals the spout to the bag. Almost immediately after heating the film, portions 70 encircled by the seal of both the end of the spout and the bag can be pulled out and removed, as shown in FIG. 10, to provide a through opening 72 communicating the spout with the interior of the bag. These portions 70 can be removed while retaining the integrity of the heat seal 68 because the film immediately adjacent the seal is softened by the heating to produce the seal.

After the seal 68 is completed and the through opening 70 created, the carrier and heat sealer are removed. Thereafter, as shown in FIG. 11, preferably the spout 24 is inverted or pulled out through the opening so that it projects externally of the bag. When viewed from the exterior of the bag this also provides a more finished appearance to the attachment of the spout to the bag and disposes the inner edge of the spout within the bag where, when the bag is in use, it is less likely to be snagged or caught and torn away or separated from the bag. The spout also separates the contents from the unfinished edge of the opening 72 and the heat seal 68 so that the contents cannot become caught or hung up thereon when discharged through the spout from the bag.

As shown in FIG. 12, after the spout or spouts of a filled bag have been opened, all of its contents may be expressed therefrom so that it is substantially completely empty by passing the flexible bag and spout through the nip of a pair of wringer rollers 74 to collapse and compress the walls of the bag together to remove its contents.

This invention may be practiced in a variety of ways, such as by attaching the spout to the outer surface of a side or end wall of the bag. If desired, the spout can be attached to a blank from which the bag is made prior to forming the entire bag from the blank. For example, the spout can be attached to a blank sheet of plastic film, either before or after it is formed into a tubular blank, such as by heat sealing together its opposed edges. Similarly, the spout can be attached to the blank after only one end of the bag is formed. Thereafter, the other end of the bag can be left entirely open, formed with an access opening or spout, or if desired, formed so that it is completely closed.

If desired, when the spout is attached to the exterior of the bag the portions 70 of the end 36 of the spout and of the bag encircled by the heat seal 68 can remain intact, and after the bag has been filled pierced when it is desired to empty the bag through the spout.

I claim:

1. A method of forming a collapsible bag having a spout comprising:
    (a) forming a collapsible bag with a continuous peripheral wall from a blank of a flexible and collapsible plastic film;
    (b) forming a separate flexible and collapsible spout from a flexible and collapsible plastic film with a continuous peripheral wall, an enclosed end and an open end;
    (c) positioning the closed end of the spout on the blank;
    (d) attaching and sealing the closed end of the spout to the blank by forming a continuous heat sealed joint; and
    (e) after forming the heat sealed joint removing a portion of the blank of the bag and a portion of the end of the spout both encompassed by the heat sealed joint to provide a through opening encompassed by the heat sealed joint and communicating the spout with the interior of the bag.

2. The method of claim 1 wherein step (c) comprises inserting the spout into the bag and positioning the closed end of the spout on an inner surface of the blank before performing steps (d) and (e).

3. The method of claim 2 wherein step (d) comprises forming a heat sealed joint by applying heat to an outer surface of the blank.

4. The method of claim 3 which also comprises after step (e) pulling the spout through the opening so that the spout is inverted with a portion inside the bag underlying the heat sealed joint and its free end is outside the blank.

5. The method of claim 4 which also comprises removing the portion of the blank of the bag and the portion of the end of the spout encompassed by the heat sealed joint substantially immediately after forming such heat sealed joint and while the material immediately adjacent such heat sealed joint is softened by the heating to produce such heat sealed joint.

6. The method of claim 1 wherein step (c) comprises applying the spout to an outer surface of the blank.

7. The method of claim 6 wherein step (d) comprises forming a heat sealed joint by applying heat to the inner surface of the blank.

8. The method of claim 7 which also comprises after step (e) pulling the spout through the opening and turning the blank inside out so the end of the spout attached to the blank is disposed inside the bag and a portion of the spout inside the bag underlies the heat sealed joint and the free end of the spout is outside the bag.

9. The method of claim 1 wherein the blank is provided with two ends and each end is sealed.

10. The method of claim 1 which also comprises sealing the spout to prevent spillage therethrough.

11. The method of claim 1 wherein said sealed joint is formed by inserting one of a heat sealer and a back up plate into the spout and abutting the closed end thereof, inserting such one of the heat sealer and back up plate with the spout thereon into the blank, locating the spout on a portion of the blank and pressing the closed end of the spout and such portion of the blank between the heat sealer and back up plate.

12. The method of claim 1 which also comprises removing the portion of the blank of the bag and the portion of the end of the spout encompassed by the heat sealed joint substantially immediately after forming such heat sealed joint and while the material immediately adjacent such heat sealed joint is softened by the heating to produce such heat sealed joint.

* * * * *